(12) United States Patent
Sun et al.

(10) Patent No.: US 9,470,793 B2
(45) Date of Patent: Oct. 18, 2016

(54) OPTICAL TRACKING OF ROTOR BLADE MOTION

(71) Applicant: Sikorsky Aircraft Corporation, Stratford, CT (US)

(72) Inventors: Fanping Sun, Glastonbury, CT (US); Zaffir A. Chaudhry, South Glastonbury, CT (US); Seung Bum Kim, Manchester, CT (US); Austin Fang, Fairfield, CT (US); Matthew James Wasilewski, Meriden, CT (US); Robert Mark Lex, Guilford, CT (US); Curtis S. James, Palm City, FL (US); Harvey A. Samuels, West Palm Beach, FL (US); Alonso Guzman, Riviera Beach, FL (US); David James Majko, Port Saint Lucie, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 186 days.

(21) Appl. No.: 13/766,126

(22) Filed: Feb. 13, 2013

(65) Prior Publication Data
US 2014/0226153 A1 Aug. 14, 2014

(51) Int. Cl.
*G01S 17/42* (2006.01)
*B64C 27/00* (2006.01)
*G01B 11/16* (2006.01)

(52) U.S. Cl.
CPC .............. *G01S 17/42* (2013.01); *B64C 27/008* (2013.01); *G01B 11/16* (2013.01)

(58) Field of Classification Search
USPC ........................................................ 356/4.01
See application file for complete search history.

(56) References Cited

U.S. PATENT DOCUMENTS

| 4,583,862 | A | * | 4/1986 | Ferrar et al. ............. 356/139.03 |
| 4,887,087 | A | * | 12/1989 | Clearwater ................... 342/61 |
| 5,137,353 | A | * | 8/1992 | Seegmiller ............. 356/139.03 |
| 5,249,470 | A | | 10/1993 | Hadley et al. |
| 6,028,303 | A | * | 2/2000 | Suzuki ......................... 250/225 |
| 2010/0128259 | A1 | | 5/2010 | Bridges et al. |
| 2010/0253569 | A1 | | 10/2010 | Stiesdal |
| 2011/0243730 | A1 | | 10/2011 | Eggleston |

FOREIGN PATENT DOCUMENTS

| JP | H10281750 A | 10/1998 |
| JP | 2010149602 A | 7/2010 |

OTHER PUBLICATIONS

European Search Report for application EP 13197490.9, mailed Jun. 25, 2014, 11 pages.

\* cited by examiner

*Primary Examiner* — Luke Ratcliffe
*Assistant Examiner* — Vicente Rodriguez
(74) *Attorney, Agent, or Firm* — Cantor Colburn LLP

(57) ABSTRACT

An optical blade tracking system for a rotary wing aircraft, the system including a light source generating at least one light beam, the light source coupled to a rotor blade of the rotary wing aircraft, wherein movement of the rotor blade is imparted to the light source; a two-dimensional position detector generating signals indicative of a position of the light beam along a first axis and a position of the light beam along a second axis and generating a signal indicative of an angular position of the light beam about a third axis; a processor receiving the signals, the processor determining at least one of lead-lag, flap and pitch of the rotor blade in response to the signals; and a polarizer filter positioned between the light source and the two dimensional position detector, the polarizer filter modulating intensity of the light beam onto the two-dimensional position detector.

18 Claims, 5 Drawing Sheets

OPTICAL TRACKING OF ROTOR BLADE MOTION

FEDERAL RESEARCH STATEMENT

This invention was made with Government support under Agreement No. W911 W6-10-2-0006 COST-A. The Government has certain rights in the invention.

BACKGROUND

The subject matter disclosed herein relates generally to rotary wing aircraft, and in particular to optically tracking blades of a rotary wing aircraft.

In the field of rotary wing aircraft, it is desirable to track blade motion. Rotating blades of a helicopter main rotor undergo an extremely complex motion trajectory with severe load conditions in a harsh environment. The on-board measurement of such rigid body motion at the root of the blade constitutes a major challenge for the helicopter industry. This measurement is particularly difficult for blades mounted to an elastomeric hinge-less bearing where the three angular motions (flap, pitch and lead-lag) are highly coupled and the elastomeric bearing pivot center shifts along the blade span due to centrifugal acceleration that varies with aerodynamic load and flight regimes. Existing methods to determine the blade motion in real time and in a non-contact fashion include holographic, Morie and laser Doppler vibrometer techniques. These non-contact optical measurement methods are only able to track one degree of freedom of motion at a time and may often fail to measure both statically and dynamically. They may also be very complex, bulky and unreliable in the main rotor environment and only appropriate for the laboratory environments and wind tunnel tests. Other methods of integrating acceleration from accelerometers or gyroscopes usually require added sensors or prior knowledge of the motion characteristics to remove drift due to integration and may be incapable of measuring static and low frequency motion of the main rotor blade.

SUMMARY

One embodiment includes an optical blade tracking system for a rotary wing aircraft, the system including a light source generating at least one light beam, the light source coupled to a rotor blade of the rotary wing aircraft, wherein movement of the rotor blade is imparted to the light source; a two-dimensional position detector generating signals indicative of a position of the light beam along a first axis and a position of the light beam along a second axis and generating a signal indicative of an angular position of the light beam about a third axis; a processor receiving the signals, the processor determining at least one of lead-lag, flap and pitch of the rotor blade in response to the signals; and a polarizer filter positioned between the light source and the two dimensional position detector, the polarizer filter modulating intensity of the light beam onto the two dimensional position detector.

Another embodiment is an optical blade tracking system for a rotary wing aircraft, the system including a light source generating at least one light beam, the light source coupled to a rotor blade of the rotary wing aircraft, wherein movement of the rotor blade is imparted to the light source; a two dimensional position detector generating signals indicative of a position of the light beam along a first axis and a position of the light beam along a second axis; and a processor receiving the signals, the processor determining at least one of lead-lag, flap and pitch of the rotor blade in response to the signals; wherein the at least one light beam comprises a first light beam and a second light beam generated at different times, the two dimensional position detector generated signals comprising a first signal indicative of a position of the first light beam along the first axis, a second signal indicative of a position of the first light beam along the second axis, a third signal indicative of a position of the second light beam along the first axis, and a fourth signal indicative of a position of the second light beam along the second axis.

Another embodiment is a method for optical blade tracking for a rotary wing aircraft, the method including generating a first light beam and a second light beam at different times, a position of the first light beam and a position of the second light beam being responsive to movement of a rotor blade of the rotary wing aircraft; determining a position of the first light beam along a first axis, a position of the first light beam along a second axis, a position of the second light beam along the first axis, and a position of the second light beam along the second axis; determining at least one of lead-lag, flap and pitch of the rotor blade in response to the position of the first light beam along the first axis, the position of the first light beam along the second axis, the position of the second light beam along the first axis, and the position of the second light beam along the second axis.

Another embodiment is a method for optical blade tracking for a rotary wing aircraft, the method including generating a polarized light beam, a position of the polarized light beam being responsive to movement of a rotor blade of the rotary wing aircraft; determining a position of the polarized light beam along a first axis and a position of the polarized light beam along a second axis; determining a direction of polarization of the polarized light beam; determining at least one of lead-lag, flap and pitch of the rotor blade in response to the position of the polarized light beam along the first axis, the position of the polarized light beam along the second axis, and the direction of polarization of the polarized light beam.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
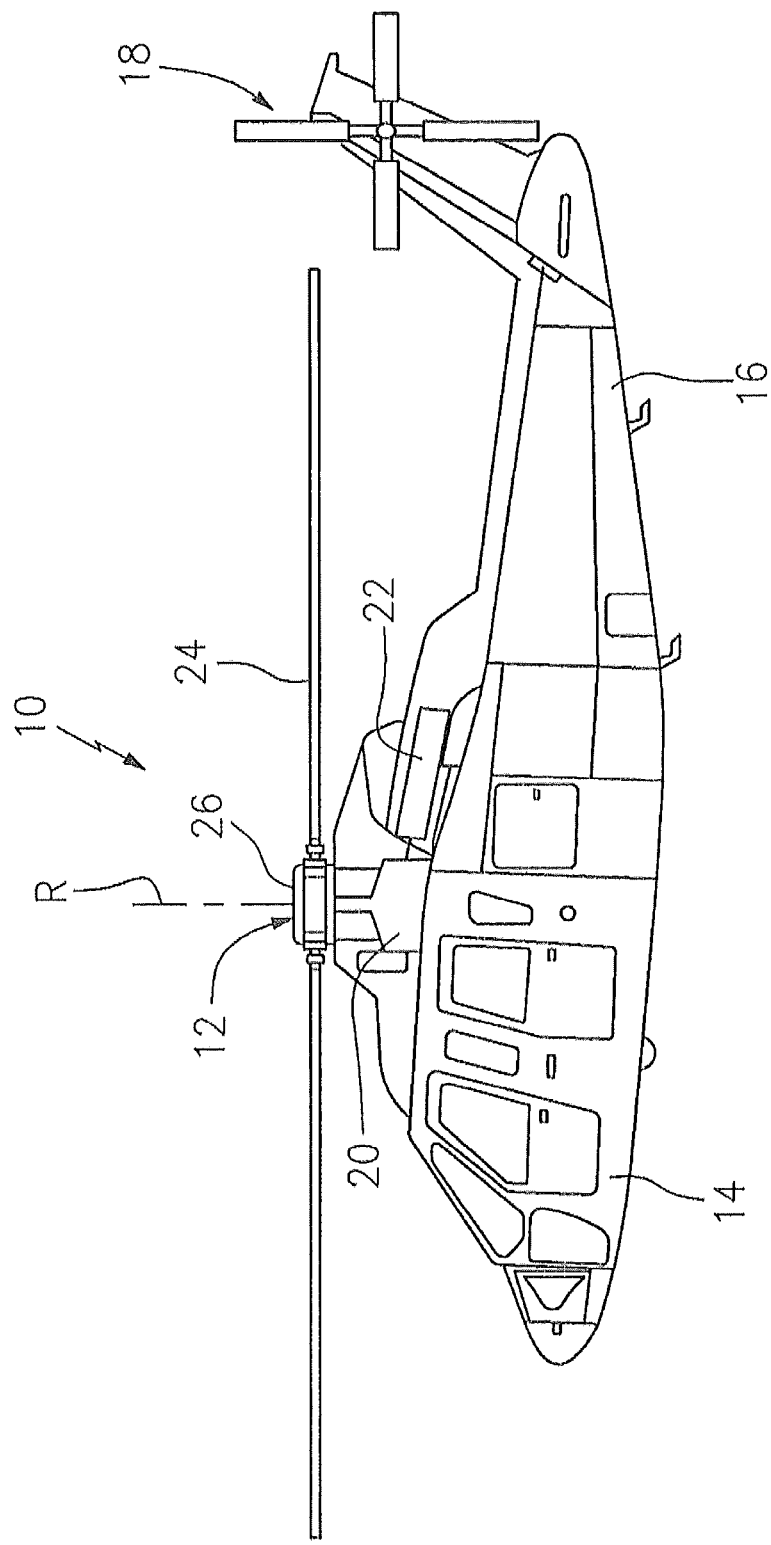
FIG. 1 depicts a rotary wing aircraft in an exemplary embodiment.

FIG. 1 illustrates a rotary wing aircraft 10 having a main rotor assembly 12 in an exemplary embodiment. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox (illustrated schematically at 20) by one or more engines 22. The main rotor assembly 12 includes a plurality of rotor blades 24 mounted to a rotor hub 26. Although a particular rotary wing aircraft configuration is illustrated, other configurations and/or machines, such as high speed compound rotary wing aircraft with supplemental translational thrust systems, dual contra-rotating aircraft, coaxial rotor system aircraft, turbo-props, tilt-rotors and tilt-wing aircraft, will also benefit from embodiments of the invention.

Figure 2:
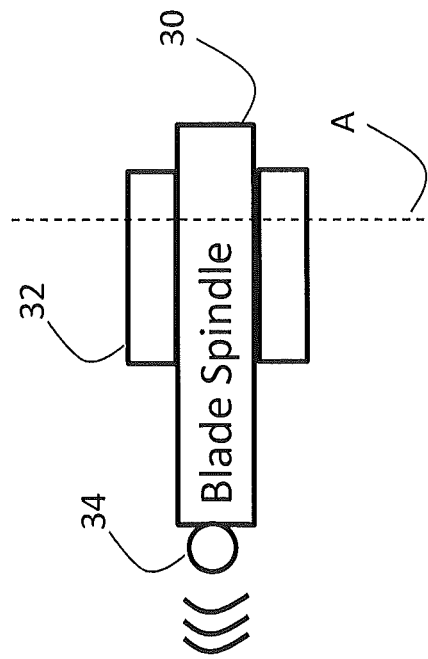
FIG. 2 depicts a system for optically tracking blade position in an exemplary embodiment.
Figure 2:
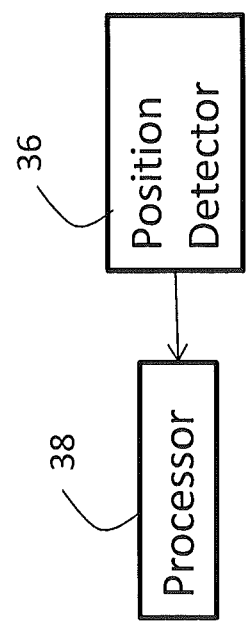

FIG. 2 depicts a system for optically tracking blade position in an exemplary embodiment. Shown in FIG. 2 is a rotor blade spindle 30 mounted to an elastomeric bearing 32. A pivot center of the elastomeric bearing 32 is shown by axis A. A light source 34 is mounted to the blade spindle 30. Other mounting or positioning arrangements may be used so that light source 34 moves with movement of rotor blade 24 coupled to spindle 30. It is understood that light source 34 may be mounted to components other than spindle 30. Light source 34 may be any known type of light source, such as a laser diode. The term "light" is used herein to refer to any frequency so that visible and non-visible wavelengths may be generated by light source 34.

A position detector 36 receives light from light source 34 and generates position signals indicative of a location of a light beam from light source 34 relative to reference axes of the position detector 36. Position detector 36 is described in further detail herein with reference to FIGS. 3 and 4. A processor 38 receives output signals from the position detector 36 and computes one or more of lead-lag, flap and pitch of rotor blade 24 coupled to blade spindle 30. Processor 38 may be implemented using a general-purpose microprocessor executing a computer program to perform the operations described herein. Processor 38 may be implemented using hardware (e.g., ASIC, FPGA) and/or a combination of hardware and software.

Figure 3:
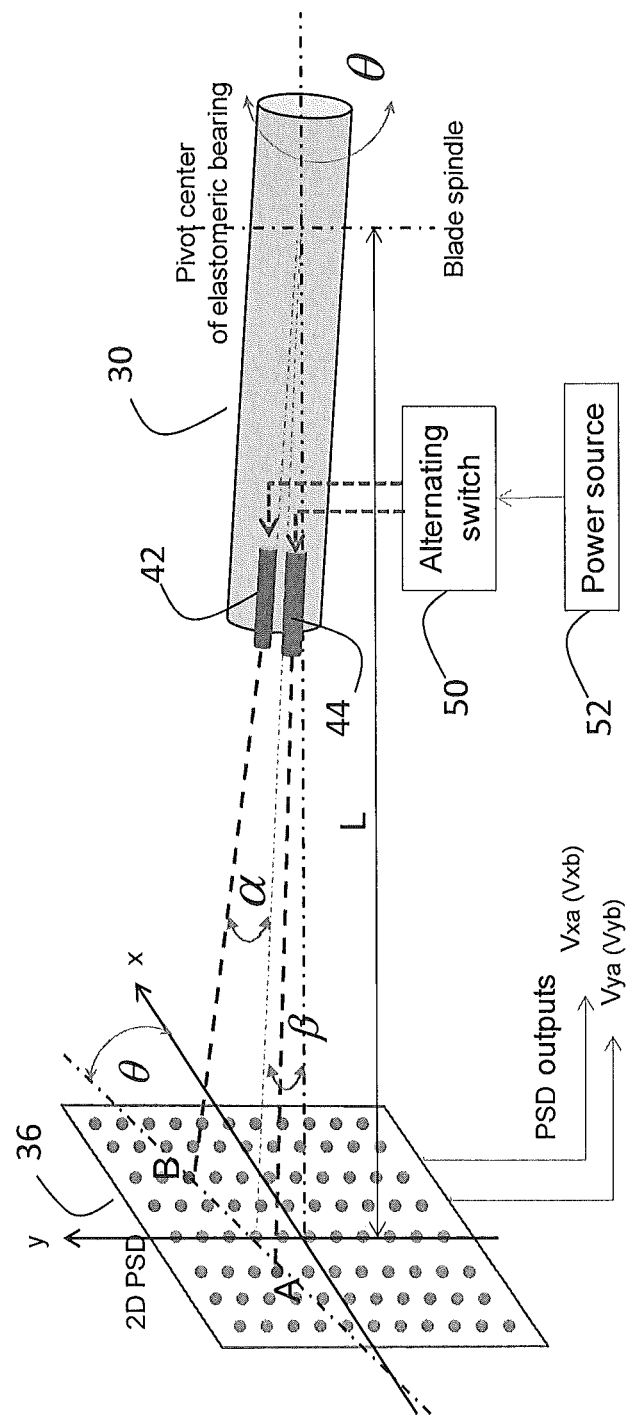
FIG. 3 depicts a system for optically tracking blade position using dual light beams in an exemplary embodiment.

FIG. 3 depicts a system for optically tracking blade position using dual light beams in an exemplary embodiment. In the embodiment of FIG. 3, two lights sources 42 and 44 are mounted to blade spindle 30. Light sources 42 and 44 may be laser diodes separated by a small angle, with each laser diode directed at position detector 36.

Position detector 36 is a two-dimensional position sensitive detector (2D PSD) that receives a light beam and outputs a voltage (Vx and Vy) proportional to x and y coordinates of the beam spot on the position detector 36. Position detector 36 may be mounted on the rotor hub.

As the position detector 36 only generates x and y coordinates for a single point, the light sources 42 and 44 are switched on and off, alternately, so that the instantaneous voltage outputs (Vx and Vy) of the position detector 36 represent the x and y coordinates along the x and y axes of the spot being currently illuminated. An alternating switch 50 is used to alternately provide power from power source 52 to the light sources 42 and 44. In this manner, only one of light source 42 and 44 produces a light beam at a time. The switch 50 may be controlled by processor 38, so that the processor 38 can synchronize the output signals from the position detector 36 with one of the light beams generated by light sources 42 and 44.

From the output signals of the position detector 36, processor 38 determines lead-lag, flap and pitch of rotor blade 24 mounted to spindle 30. The three angular motions of the blade spindle 30 can be calculated from the measured voltage outputs from the position detector 36 as shown below.

Lead-lag $$\alpha = a\tan((x_a+x_b)/(2L)) \approx (x_a+x_b)/(2L) = c_1(V_{xa}+V_{xb})$$

Flap $$\beta = a\tan((y_a+y_b)/(2L)) \approx (y_a+y_b)/(2L) = c_2(V_{ya}+V_{yb})$$

Pitch $$\theta = a\tan((y_b-y_a)/(x_b-x_a)) \approx c_3(V_{ya}-V_{yb})/(V_{xa}-V_{xb})$$

In the above equations, the notations a and b represent the two light sources 42 and 44, respectively. The value L is the distance from the position detector 36 to the pivot axis of the blade spindle 30. Coefficients $c_1$, $c_2$ and $c_3$ are used to approximate the lead-lag, flap and pitch, respectively.

The angular motions of flap and lead-lag are linearly determined by the average x and y coordinates of the two laser spots, respectively. The pitch motion is calculated based on the difference of two sets of the coordinates. The embodiment of FIG. 3 provides a direct measurement (each motion is proportional to the voltages) without need for computational conversion. The measurements of the three angular motions are also immune to the shift of the elastomeric bearing pivot center due to various centrifugal loading (e.g., x and y coordinates change with shift in distance L).

In the embodiment of FIG. 3, two light beams are produced by alternately powering a first light source 42 and a second light source 44. It is understood that other techniques may be employed to generate the two light beams. For example, in an alternative embodiment both light sources 42 and 44 are constantly powered, and a shutter is alternately positioned to block one of the two light sources. The shutter may be controlled by processor 38, so that the processor 38 can synchronize the output signals from the position detector 36 with one of the light beams generated by light sources 42 and 44. In another embodiment, a single light source is used and a positionable optical element (e.g., prism, lens system) is used to generate two light beams having the desired angular relationship. The optical element may be controlled by processor 38, so that the processor 38 can synchronize the output signals from the position detector 36 with one of the light beams generated by the optical element.

Figure 4:
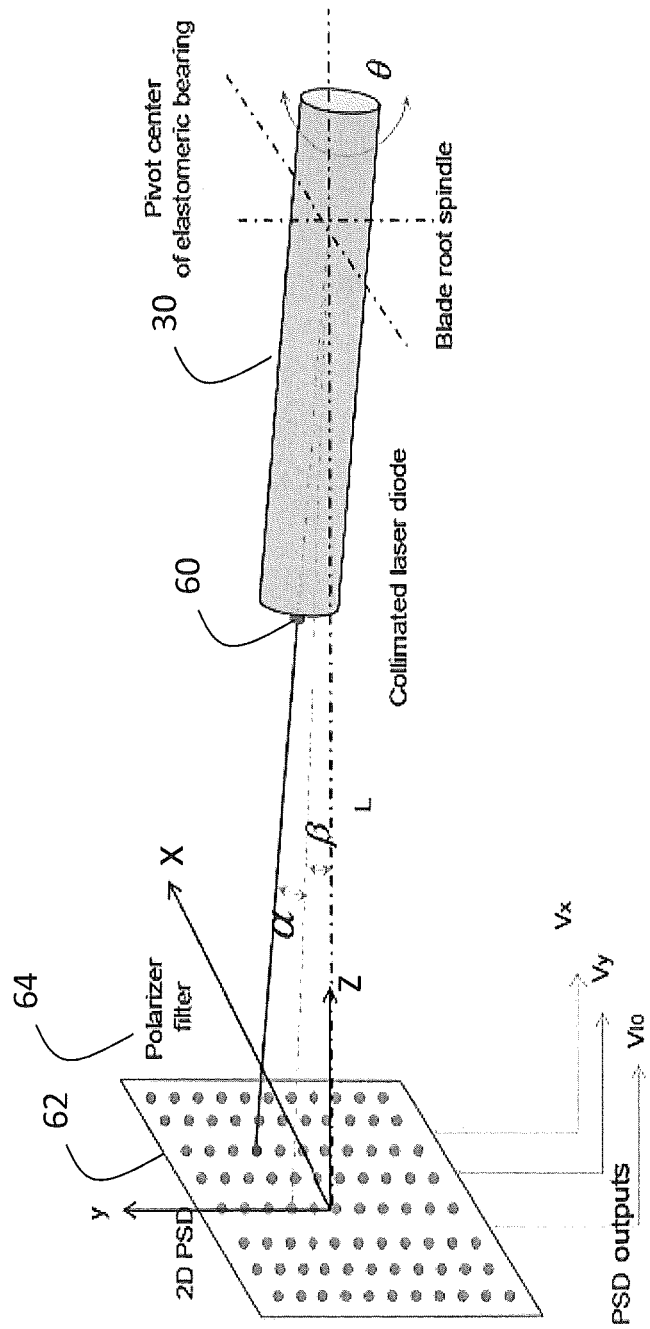
FIG. 4 depicts a system for optically tracking blade position using a polarized light beam in an exemplary embodiment.

FIG. 4 depicts a system for optically tracking blade position using a polarized light beam in an exemplary embodiment. As shown in FIG. 4, a single light source 60 (e.g., a laser diode) is mounted to blade spindle 30. Light source 60 outputs a collimated, polarized light beam. Position detector 62 is a two-dimensional position sensitive detector (2D PSD) that receives a light beam and outputs a voltage (Vx and Vy) proportional to x and y coordinates along the x and y axes of the beam spot on the detector 62. Position detector 62 also generates an intensity output $V_{IO}$ that is proportional to an intensity of the light beam on the position detector 62. Position detector 36 may be mounted on the rotor hub. A polarizing filter 64 is positioned in front of the position detector 60.

Figure 5:
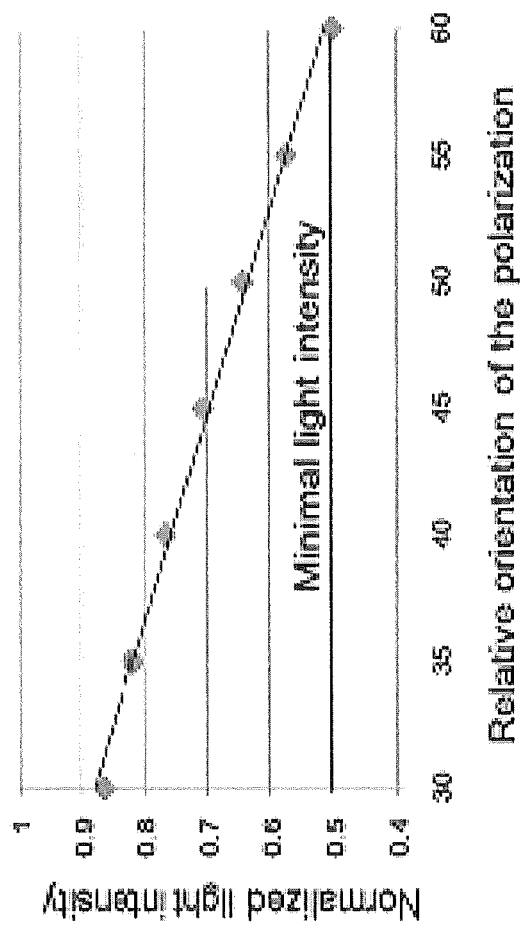
FIG. 5 is a plot of light intensity versus relative polarization in an exemplary embodiment.

The x and y coordinates from position detector 62 provide for computation of lead-lag and flap. The use of a polarized light beam and polarizing filter 64 make it possible to determine pitch. When position detector 62 with polarizer filter 64 receives a polarized light beam, the intensity of the light beam impinging position detector 62 is modulated by the relative orientation of the light source polarization direction and the polarizer filter polarization direction. This is represented in the intensity output $V_{IO}$. The intensity of the polarized light passing through the polarizing filter 64 varies between zero and maximum as the light source 60 rotates with respect to the polarizer filter 64 from 90 degrees to 0 degrees. FIG. 5 illustrates light intensity at the position detector 62 versus relative angle between the polarization direction of the light source 60 and polarization direction polarization filter 64. Therefore, the position detector 62 intensity output is representative of the pitch angle (rotation about z axis) of blade 24.

The three angular motions of the blade spindle 30 can be calculated from the measured voltage outputs from the position detector 62 as shown below.

Lead-lag $$\alpha = a\tan(x/L) \approx x/L = c_1 V_x$$

Flap $$\beta = a\tan(y/L) \approx y/L = c_2 V_y$$

Pitch $$\theta = bI_0\cos^2(\theta) \approx c_3 I_0 \theta = c_3 V_{IO}$$

In the above equations, the value L is the distance from the position detector 62 to the pivot axis of the blade spindle 30. Coefficients $c_1$, $c_2$ and $c_3$ are used to approximate the lead-lag, flap and pitch, respectively.

The embodiment of FIG. 4 provides a direct measurement (each motion is proportional to the voltage) without need for computational conversion. The measurement of the three angular motions is also immune to the shift of the elastomeric bearing pivot center due various centrifugal loading (e.g., x and y coordinates change with shift in distance L).

Embodiments provide three degrees of angular motion measurement simultaneously using one sensor. This provides for dynamic and static measurements with the same level of accuracy. The measurements are immune to shifts of the elastomeric bearing pivot center due aerodynamic and/or centrifugal loading. Direct measurements of angular motions are provided with minimal computation requirements.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An optical blade tracking system for a rotary wing aircraft, the system comprising:
    a light source generating at least one polarized light beam, the light source coupled to a rotor blade of the rotary wing aircraft, wherein movement of the rotor blade is imparted to the light source;
    a two-dimensional position detector generating signals indicative of a position of the light beam along a first axis and a position of the light beam along a second axis, the first axis and the second axis being in the same plane, the two-dimensional position detector generating an intensity signal indicative of an angular position of the light beam about a third axis, the third axis perpendicular to the plane;
    a processor receiving the signals, the processor determining at least one of lead-lag, flap and pitch of the rotor blade in response to the signals; and
    a polarizer filter positioned between the light source and the two dimensional position detector, the polarizer filter modulating intensity of the light beam onto the two-dimensional position detector.

2. The optical blade tracking system of claim 1, wherein: the two-dimensional position detector generates an intensity signal indicative of an intensity of the light beam on the two-dimensional position detector.

3. The optical blade tracking system of claim 2, wherein: the intensity signal is indicative of an angular orientation between a light source polarization direction and a polarizer filter polarization direction.

4. The optical blade tracking system of claim 3, wherein: the processor determines lead-lag of the rotor blade as:

$$\alpha \approx c_1(V_x)$$

wherein $V_x$ is indicative of the position of the light beam along the first axis, and $c_1$ is a coefficient.

5. The optical blade tracking system of claim 3, wherein: the processor determines flap of the rotor blade as:

$$\beta \approx c_2 V_y$$

wherein $V_y$ is indicative of the position of the light beam along the second axis and $c_2$ is a coefficient.

6. The optical blade tracking system of claim 3, wherein: the processor determines pitch of the rotor blade as:

$$\theta \approx c_3 V_{IO}$$

wherein $V_{IO}$ is the intensity signal and $c_3$ is a coefficient.

7. An optical blade tracking system for a rotary wing aircraft, the system comprising:
    at least one light source generating a first light beam and a second light beam generated at different times, the light source coupled to a rotor blade of the rotary wing aircraft, wherein movement of the rotor blade is imparted to the light source;
    a two-dimensional position detector generating signals indicative of a position of the first light beam and the second light beam along a first axis and along a second axis; and
    a processor receiving the signals, the processor determining at least one of lead-lag, flap and pitch of the rotor blade in response to the signals;
    wherein the two-dimensional position detector generates signals comprising a first signal indicative of a position of the first light beam along the first axis, a second signal indicative of a position of the first light beam along the second axis, a third signal indicative of a position of the second light beam along the first axis, and a fourth signal indicative of a position of the second light beam along the second axis, the first signal, second signal, third signal and fourth signal indicative of pitch of the rotor blade about a third axis, the third axis perpendicular to the plane.

8. The optical blade tracking system of claim 7, wherein: the light source comprises a first light source generating the first light beam and a second light source generating the second light beam.

9. The optical blade tracking system of claim 8, further comprising:
a switch to alternately provide power the first light source and the second light source.

10. The optical blade tracking system of claim 8, further comprising:
a shutter to alternately block an output of the first light source and the second light source.

11. The optical blade tracking system of claim 7, further comprising:
a positionable optical element receiving the light beam and alternately generating the first light beam and the second light beam.

12. The optical blade tracking system of claim 7, wherein: the processor determines lead-lag of the rotor blade as:

$$\alpha \approx c_1(V_{xa}+V_{xb})$$

wherein $V_{xa}$ is indicative of the position of the first light beam along the first axis, $V_{xb}$ is indicative of the position of the second light beam along the first axis and $c_1$ is a coefficient.

13. The optical blade tracking system of claim 7, wherein: the processor determines flap of the rotor blade as:

$$\beta \approx c_2(V_{ya}+V_{yb})$$

wherein $V_{ya}$ is indicative of the position of the first light beam along the second axis, $V_{yb}$ is indicative of the position of the second light beam along the second axis and $c_2$ is a coefficient.

14. The optical blade tracking system of claim 7, wherein: the processor determines pitch of the rotor blade as:

$$\theta \approx c_3(V_{ya}-V_{yb})/(V_{xa}-V_{xb})$$

wherein $V_{ya}$ is indicative of the position of the first light beam along the second axis, $V_{yb}$ is indicative of the position of the second light beam along the second axis, $V_{xa}$ is indicative of the position of the first light beam along the first axis, $V_{xb}$ is indicative of the position of the second light beam along the first axis and $c_3$ is a coefficient.

15. A method for optical blade tracking for a rotary wing aircraft, the method comprising:
generating a first light beam and a second light beam at different times, a position of the first light beam and a position of the second light beam being responsive to movement of a rotor blade of the rotary wing aircraft;
determining a position of the first light beam along a first axis, a position of the first light beam along a second axis, a position of the second light beam along the first axis, and a position of the second light beam along the second axis, the first axis and the second axis being in the same plane;
determining lead-lag, flap and pitch of the rotor blade in response to the position of the first light beam along the first axis, the position of the first light beam along the second axis, the position of the second light beam along the first axis, and the position of the second light beam along the second axis, wherein the pitch of the rotor blade is about a third axis, the third axis perpendicular to the plane.

16. The method of claim 15 wherein:
determining pitch of the rotor blade includes dividing (i) a difference between the position of the first light beam along the second axis and the position of the second light beam along the second axis by (ii) a difference between the position of the first light beam along the first axis and the position of the second light beam along the first axis.

17. A method for optical blade tracking for a rotary wing aircraft, the method comprising:
generating a polarized light beam, a position of the polarized light beam being responsive to movement of a rotor blade of the rotary wing aircraft;
determining a position of the polarized light beam along a first axis and a position of the polarized light beam along a second axis, the first axis and the second axis being in the same plane;
determining an intensity of the polarized light beam, the intensity of the polarized light beam indicative of an angular position of the polarized light beam about a third axis, the third axis perpendicular to the plane including the first axis and the second axis;
determining lead-lag, flap and pitch of the rotor blade in response to the position of the polarized light beam along the first axis, the position of the polarized light beam along the second axis, and the intensity of the polarized light beam.

18. The method of claim 17 wherein:
determining pitch of the rotor blade includes determining an angle between the direction of polarization of the polarized light beam and a predetermined direction of polarization in response to the intensity of the polarized light beam.

* * * * *